(12) United States Patent
Mülle

(10) Patent No.: US 7,690,183 B2
(45) Date of Patent: Apr. 6, 2010

(54) CHAIN LOCK FOR ROUND STEEL CHAINS

(75) Inventor: Wilhelm Mülle, Fröndenberg (DE)

(73) Assignee: Thiele GmbH & Co. KG, Iserlohn (DE)

( * ) Notice: Subject to any disclaimer, the term of this patent is extended or adjusted under 35 U.S.C. 154(b) by 0 days.

(21) Appl. No.: 12/298,240

(22) PCT Filed: Apr. 11, 2007

(86) PCT No.: PCT/DE2007/000631

§ 371 (c)(1),
(2), (4) Date: Oct. 23, 2008

(87) PCT Pub. No.: WO2007/124713

PCT Pub. Date: Nov. 8, 2007

(65) Prior Publication Data

US 2009/0095035 A1   Apr. 16, 2009

(30) Foreign Application Priority Data

Apr. 24, 2006   (DE) .................. 20 2006 006 731 U

(51) Int. Cl.
*F16G 15/02* (2006.01)
*F16G 15/04* (2006.01)

(52) U.S. Cl. .................... 59/85; 59/84; 59/87; 59/93
(58) Field of Classification Search .............. 59/78, 59/85, 86, 93
See application file for complete search history.

(56) References Cited

U.S. PATENT DOCUMENTS

| 2,052,066 | A * | 8/1936 | Younie | 59/85 |
| 6,021,634 | A * | 2/2000 | Brodziak | 59/85 |
| 6,220,011 | B1 * | 4/2001 | Dalferth et al. | 59/85 |
| 6,223,517 | B1 * | 5/2001 | Bogdan et al. | 59/85 |
| 7,024,849 | B2 * | 4/2006 | Benecke et al. | 59/85 |
| 7,263,821 | B2 * | 9/2007 | Nuding et al. | 59/85 |

FOREIGN PATENT DOCUMENTS

| DE | 22 00 381 B1 | 5/1973 |
| DE | 197 43 025 C1 | 5/1999 |
| DE | 20 2004 009459 | 10/2004 |
| WO | WO 83/02653 | 8/1983 |
| WO | WO 2004/097252 | 11/2004 |

* cited by examiner

*Primary Examiner*—David B Jones
(74) *Attorney, Agent, or Firm*—Henry M. Feiereisen; Ursula B. Day

(57) ABSTRACT

Disclosed is a chain lock for round steel chains, comprising two lock halves, each of which is provided with a rear section (4, 5) that extends in the longitudinal direction of the chain lock (1) as well as coupling sections (6 to 9) that adjoin the ends of the rear section (4, 5). One respective coupling section (6, 8) is fitted with a locking pin (16) which extends perpendicular to a parting plane (TE) of the chain lock (1) and encompasses a web-like projection (22) at the free end (18) thereof, on the side facing the other coupling section (7, 9). The projection (22) borders a pocket that extends from one side surface (20) to another side surface (21) of the lock half (2, 3) and accommodates a forked leg (26) of the other lock half (2, 3), which conforms to the contour of the pocket (23). The pocket (23) has external, essentially rectilinear flanks (27, 28) which face the side surfaces (20, 21), the angle (W1) enclosed by the flanks (27, 28) ranging from 120° to 150°.

8 Claims, 3 Drawing Sheets

CHAIN LOCK FOR ROUND STEEL CHAINS

BACKGROUND OF THE INVENTION

The invention relates to a chain lock for round steel chains.

In the state of the art, DE 197 43 025 C1 discloses a block connecting link for round steel chains having two identical link halves. Each link half has a substantially rectangular cross-section with a straight rear surface, plane side surfaces, convexly curved end surfaces, and receptacles for steel chain links located next to the transverse middle plane and facing the center parting plane. Provided on one end of each link half is a projection having a bracket protruding towards the neighboring end surface, and provided on the other end is a projection having a recess that conforms to the bracket. A pin protrudes at the projection having the recess for engagement into a pocket next to the projection. The principal axes of the bracket, recesses, pins and pockets extend at an angle in relation to the transverse middle plane. A supporting cam is provided between the receptacles of each link half. In the case of this block connecting link, all pin-type connections contribute to receiving the longitudinal forces, to achieve a high breaking force and a high number of stress reversals. It was determined, however, that the locking pins respectively arranged at the ends and driven into the pin via cross bores are also subjected to high shear stress. On the other hand, interlocking at the ends shall not be forgone so that the link halves may not easily spread apart under load stress.

DE 20 2004 009 459 U1 describes a chain lock for steel links chains having two identical chain lock parts that can be mounted to each other in the longitudinal direction and that are arranged in a rotationally symmetric manner. Each lock part includes a center bar extension to form a center bar when the lock parts are mounted to each other. The arc sections at the ends of each lock part respectively form one of two complementary coupling members. Locking pins that are introduced into corresponding bores effectuate the interlocking of the lock halves in the area of the center bar. Undercut interlocking bars are respectively formed in the end sections, wherein the interlocking bars engage into a correspondingly configured pocket of the other lock part. As a result of the undercut at the interlocking bars and the pocket provided for receiving the interlocking bar, the lock parts are interlocked. The interlocking bar and the interlocking pocket, respectively, transfers the tensile forces exerted on the chain lock to the respective other lock half so that the interlocking bars assume a dual function because they simultaneously prevent the lock halves from separating from each other transversely to the longitudinal extension.

SUMMARY OF THE INVENTION

The invention is based on the object to provide a chain lock for round steel chains that can be exposed to a higher degree of load stress and, in particular, prevents a shearing of the lock halves under load stress.

The object is solved in accordance with the invention by a chain lock for round steel chains having two lock halves, each of which having a rear section extending in the longitudinal direction of the chain lock and terminating in coupling sections. Each of the coupling sections has a locking pin which protrudes transversely to a parting plane of the chain lock. The locking pin has on its outside facing the other coupling section, on its free end a web-like projection that extends from side surface to side surface of the lock half and borders a pocket. The pocket receives a fork leg of the other lock half, with the fork leg matching the contour of the pocket.

It is an essential feature of the chain lock according to the invention that the pocket has substantially linear outer flanks that face the side surfaces, wherein the angle enclosed by the flanks is in the range from 120° to 150°.

Experiments have shown that the configuration of the projection and/or the flanks substantially affects the load-bearing capacity of the chain lock because the projection can shear off at high load stress under the influence of the transverse forces. Very small projections as well as greatly protruding projections have proven to be disadvantageous. Experiments have shown in particular that it is not necessary to arrange the flanks substantially parallel and/or at an acute angle to each other. Rather, it is advantageous if the angle enclosed by the flanks is in the range from 120° to 150°. Even with this geometry, it is possible to absorb high transverse forces, whereby the production of such-shaped pockets is only slightly more complex than in the case of locking pins without pockets.

Furthermore, due to its capability to absorb high transverse forces, the configuration of the locking pin according to the invention allows a shift of the interlock by means of a locking pin to a center support between the rear sections of the lock halves. As a result, the cross bores on the end sides of the coupling sections, required heretofore, are not necessary, and, thus, there are no local inhomogeneities in the stress distribution that are caused by the cross bores because the inhomogeneities ultimately lead to stress peaks and premature failure of the lock halves. The shear stress generated by the struck round steel chain is lower in the area of the center bar so that, if appropriately dimensioned, a single bore with a locking pin can be sufficient.

It is considered particularly suitable if one center support has a groove that extends in the longitudinal direction of the chain lock and the other center support has a tongue that fits into the groove, with the groove and the tongue being traversed by at least one cross bore to receive the locking pin. Theoretically, the groove and the tongue could also have a single leg configuration in the area of the center support so that merely two centrally protruding lugs are traversed by a locking pin. However, in such a configuration, higher shear forces are generated in the locking pin than in a classic tongue and groove arrangement. In any case, the lock halves are still symmetrical parts during the forging process, with the asymmetry experienced only later due to the machining process. The asymmetry is exclusively caused by the configuration of the center support. Except for the configuration of the center support, the lock halves are configured in identical manner.

To absorb maximal transverse forces and/or to cause minimal bending moments in the web-like projection of the locking pin, the fork leg engaging the pockets has engagement areas facing the flanks. The engagement areas enclose the same angle as the flanks of the pockets. As a result of this matching contour of the pocket and the fork leg, there is maximum overlap in the transversal direction, thereby improving the load-bearing capacity of the chain lock.

It is also of advantage that the flanks of the pocket and the engagement areas of the fork leg do not touch each other, when the lock halves are coupled to each other. Instead, the flanks of the pocket and the engagement areas of the fork leg are arranged such that they have play. In other words, in the normal case, no longitudinal forces generated by the chain are transferred via the locking pin and the pocket. The single purpose of the locking pin is to absorb transverse forces that are induced by, e.g., the introduced longitudinal forces.

To absorb longitudinal forces, randomly configured coupling areas may be provided at the chain lock. Preferably, the coupling section that supports the locking pin has a receptacle to form-fittingly integrate a cam of the other lock half which cam is suited to the receptacle. Longitudinal forces that are exerted on the chain lock can be introduced into the respective other lock half via the cams and the receptacles. Therefore, the receptacles and the cams are arranged in the area of the main direction of tension, i.e., in the area of the parting plane of the chain lock. It is advantageous if the principal axes of the receptacles and the cams are arranged at an angle relative to the transverse middle plane of the chain lock. The angle between the principal axes of the transverse middle plane is hereby so small that the desired small axial relative movement of the lock halves during assembly and disassembly of a block lock is only slightly increased. Sliding off of the areas of the cams and the receptacles in contact with each other is prevented in view of the inclination of the cams and the receptacles relative to the transverse middle plane of the lock halves.

BRIEF DESCRIPTION OF THE DRAWING

An exemplary embodiment of the invention will now be described in more detail with reference to the drawings, in which.

DETAILED DESCRIPTION OF PREFERRED EMBODIMENTS

Figure 1:
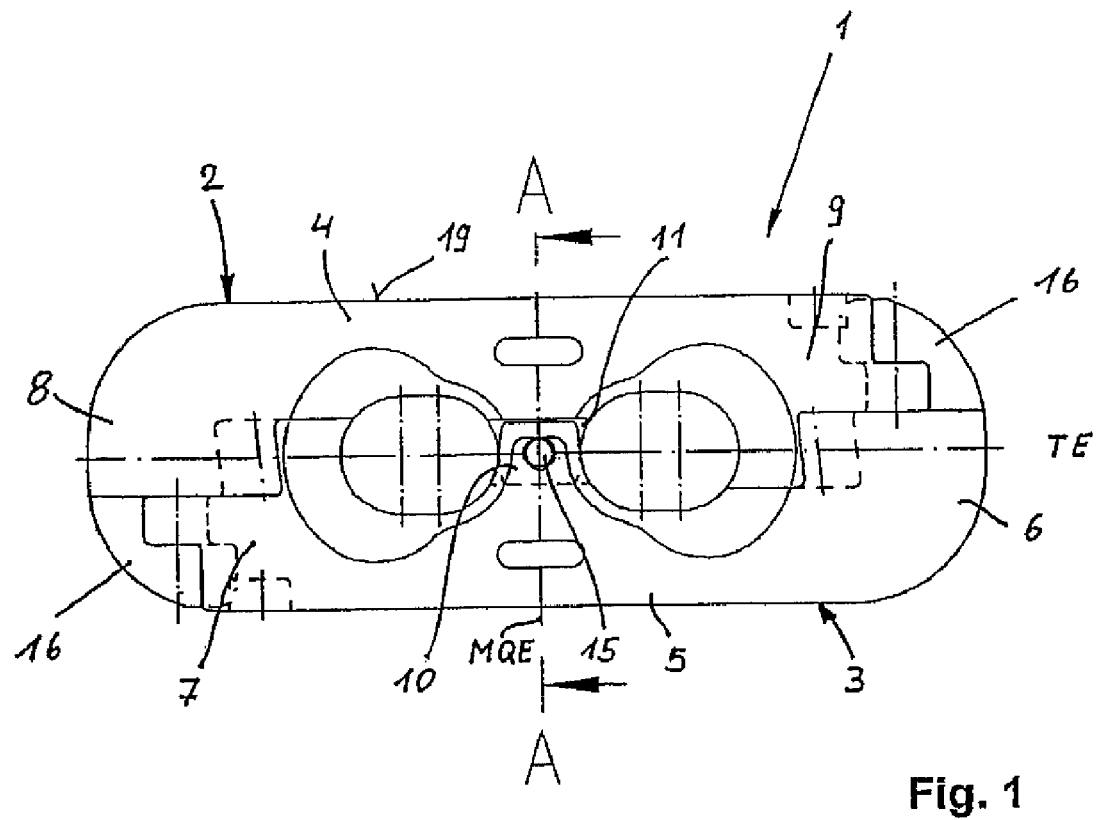
FIG. 1 shows a chain lock in assembled state.

FIG. 1 shows a chain lock 1 having two substantially L-shaped lock halves 2, 3. Each of the lock halves 2, 3 has rear sections 4, 5 that extend in the longitudinal direction, i.e., in the direction of their parting plane TE-TE, and terminate in coupling sections 6, 7, 8, 9.

Figure 2:
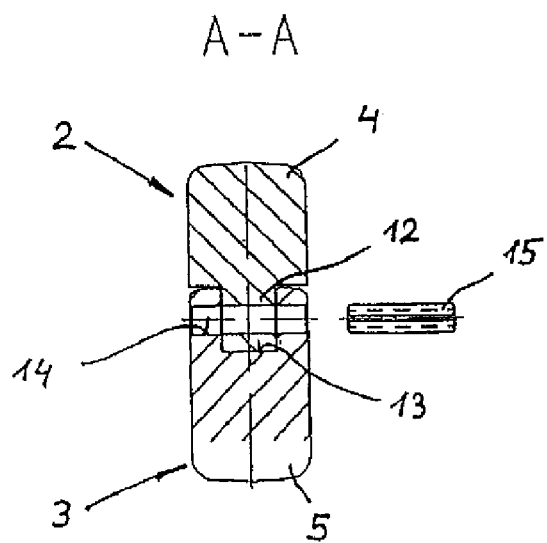
FIG. 2 shows a section of the chain lock of FIG. 1 along line A-A.

The rear sections 4, 5 of the lock halves 2, 3 have center supports 10, 11, via which the rear sections 4, 5 are supported with respect to each other so that a central necking of the chain lock 1 under tensile loading is avoided. FIG. 2 shows a sectional view along line A-A, i.e., along the transverse middle plane MQE of the chain lock 1, with a tongue 12 of the upper lock half 2 in the drawing plane engaging a groove 13 of the center support 11 of the lower lock half. A cross bore 14 is arranged in the area of the groove 13 and the tongue 12 for receiving a locking pin 15 in the form of a tension pin.

Figure 3:
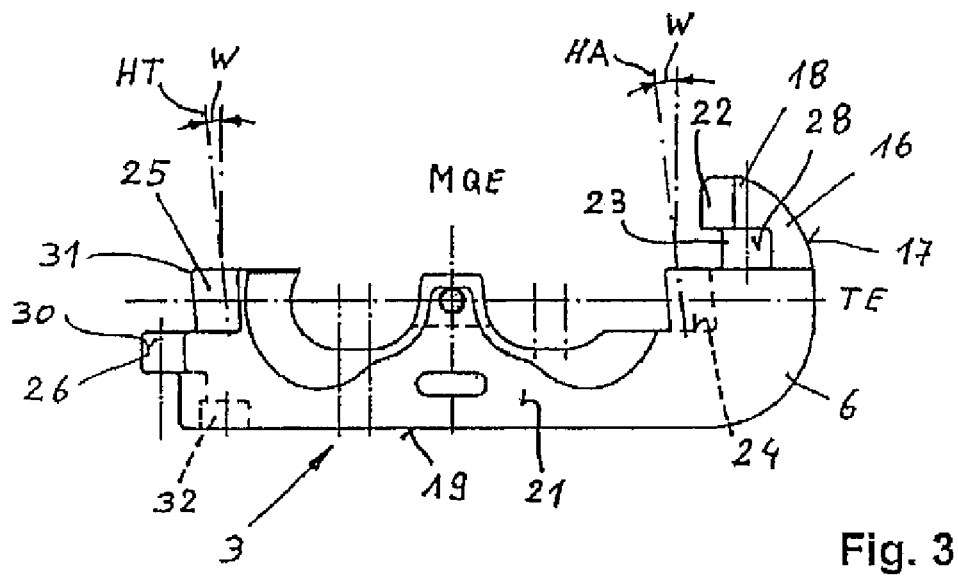
FIG. 3 shows a side view of the lower chain lock in FIG. 1.

Besides the configuration of the center support 10, 11, the configuration of the coupling sections 6, 7, 8, 9 is essential for the chain lock in accordance with the invention. FIG. 3 illustrates that, in the lower lock half 3, the right coupling section 6 in the drawing plane has two height levels. On one hand, there is a locking pin 16 above the parting plane TE that extends transversely to the parting plane TE of the chain lock 1 in an upwards direction so that each lock half 2, 3 is basically L-shaped. The locking pin 16 is part of the end surface 17 of the coupling section 6, whereby its free end 18 extends into the plane of the rear surface 19 of the rear section 4 of the other lock half 2. Corresponding to the contour of the chain links to be connected, the end surfaces 17 of the chain lock 1 are also rounded.

The locking pin 16 has on its free end 18 a web-like projection 22 which extends from side surface 20 to side surface 21 (cf. FIGS. 4 and 5) of the chain lock 1 so that a pocket 23 below the projection 22 is defined. The pocket 23 is illustrated by dashed lines in FIG. 5.

The coupling section 6 further has a receptacle 24 for form-fitting incorporation of a cam 25 of the other lock half which cam is conformed to the receptacle 24. The receptacle 24 and the cam 25 transfer forces acting in the longitudinal direction, i.e., in the direction of the parting plane TE of the chain lock 1. To avoid sliding of the cam 25 out of the receptacle 24, the principal axis HA of the receptacle 24 and the principal axis HN of the cam, respectively, define with the transverse middle plane an angle W in the range from 3° to 7° (FIG. 3). The locking pin 16 with the projection 22 and the thus formed pocket 23 is located outside the main load direction, i.e., outside the parting plane TE and primarily absorbs transverse forces that act transversely to the parting plane TE. The transverse forces are absorbed by the projection 22 and by a fork leg 26 that conforms to the pocket 23.

Figure 5:
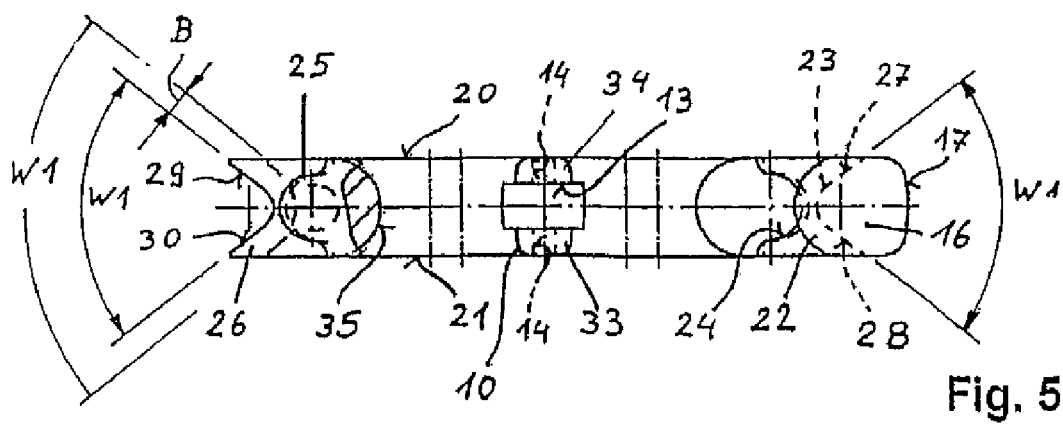
FIG. 5 shows a top view of the block lock of FIG. 3.

FIG. 5 illustrates that the outer flanks 27, 28 of the pocket 23 which face the side surfaces 20, 21 are linear, with the flanks 27, 28 enclosing an angle W1 in the range from 120° to 150°. The same angle W1 is also defined by the engagement areas 29, 30 of the fork leg 26 that face the flanks 27, 28. The transition between the engagement areas 29, 30 and the flanks 27, 28, respectively, is round.

The projection 22 has a constant width B along its entire extension. Therefore, the projection 22 has a larger radius than the transition area between the flanks 27, 28. As a result, the flanks of the projection are also arranged relative to each other at the angle W1 which corresponds to the angle W1 between the flanks of the pocket 23 (FIG. 5).

The width of the projection 22 is dimensioned such that a cam 25 can be passed by the front side of the projection 22 in an inclined manner while maintaining the angle W (FIG. 3) so that, just prior to assembling, the outer edge 21 of the cam 25 is positioned below the projection 22. That is, the projection 22 not only extends across the pocket 23 but also across the lowest point of the receptacle 24, as shown in FIG. 5.

Figure 4:
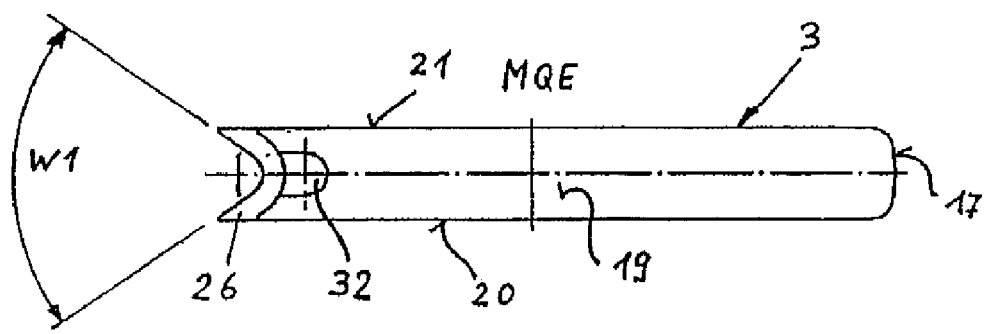
FIG. 4 shows the block lock of FIG. 3 in viewing direction towards its rear section.

FIG. 4 shows that a recess 32 in the area of the fork leg 26 is formed in the rear surface 19 of the lock half 3. In this way, after removing the locking pin 16, a bolt can be placed on the lock halves 2, 3 so that knocks can be applied onto the locking pin 16 via the bolt in order to separate the lock halves from each other.

Figure 6:
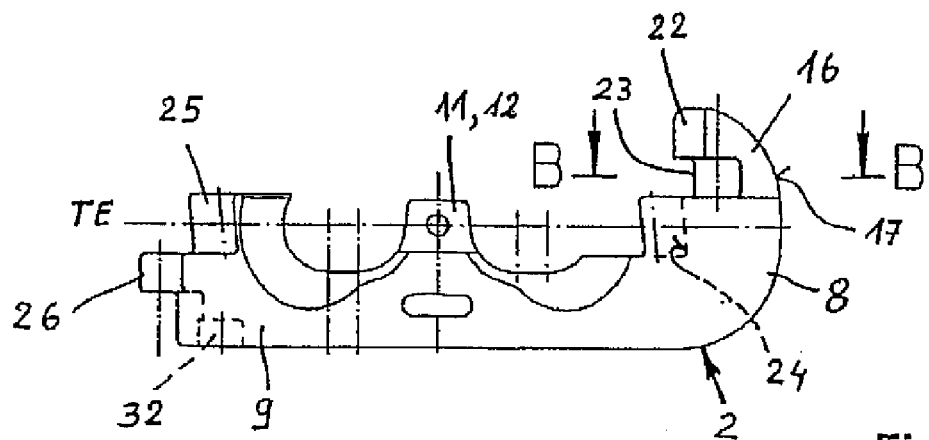
FIG. 6 shows a side view of the upper block lock in the drawing plane of FIG. 1.
Figure 7:
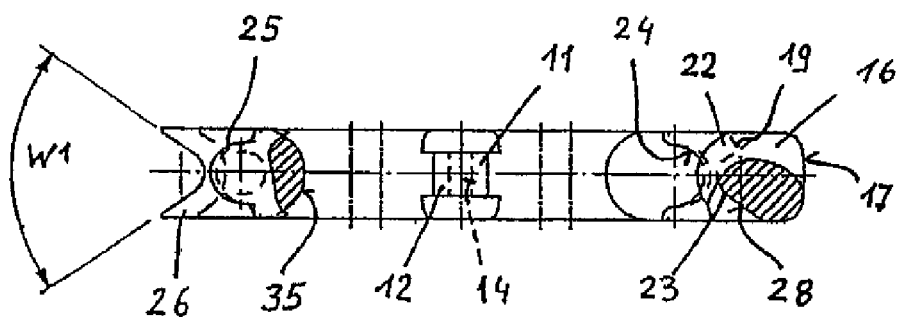
FIG. 7 shows a top view of the block lock in FIG. 6.

While the lock half 3 of FIG. 5 has in the area of the center support 10 a groove 13 which is defined by two opposing lugs traversed by the cross bore 14, the second lock half has a central tongue 12 at its center support 11, as shown in FIGS. 6 and 7.

FIG. 6 clearly illustrates that the coupling sections of the lock half 2 are not different of those in FIG. 3. Therefore, the reference numerals introduced in FIGS. 3-5 are used for this lock half 2. Reference is made to the description above.

Figure 8:
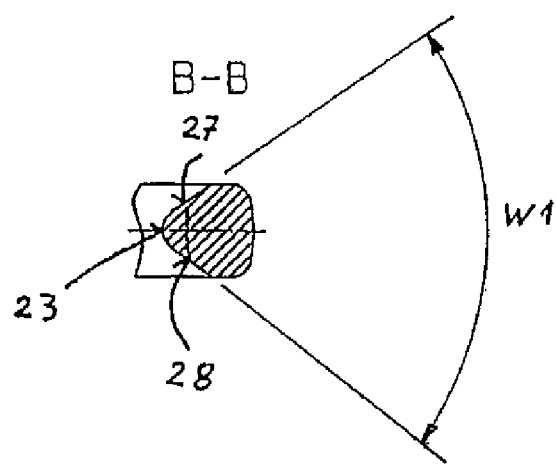
FIG. 8 shows a section along line B-B of FIG. 6.

Finally, FIG. 8 shows once again the special configuration of the flanks 27, 28 in the area of the pocket 23 of the locking pin 16.

The hatched areas in FIG. 7 show, on the one hand, a partial section through the locking pin 16 in the area of the pocket 23 and, on the other hand in the left drawing region, a partial section through the receptacle 35 which is intended to integrate a chain link.

What is claimed is:

1. A chain lock for steel chains, comprising:
two lock halves, each lock half having a rear section having opposite ends and extending in a longitudinal direction of the chain lock;
a plurality of coupling sections, each coupling section terminating at a respective one of the opposite ends of the rear section; and
a locking pin arranged at one of the coupling sections and transversely positioned in relation to a parting plane of the chain lock, said locking pin having a free end formed with a web-like projection, thereby defining a pocket which extends from one side surface of the lock half to another side surface of the lock half and which has substantially linear outer flanks that face the side surfaces of the lock half and enclose an angle in a range from 120° to 150°; and
a fork leg arranged at the other one of the coupling sections and having a contour that conforms to the pocket, the fork leg structured to be received by the pocket of the respectively other lock half.

2. The chain lock of claim 1, wherein the fork leg has engagement areas which face the outer flanks of the pocket and enclose a same angle as the angle of the flanks of the pocket.

3. The chain lock of claim 2, wherein the outer flanks of the pocket and the engagement areas have play, when the two lock halves are coupled to each other.

4. The chain lock of claim 1, wherein the one coupling section has a receptacle to form-fittingly receive a complementary cam of the other lock half to allow introduction of tensile forces acting at the chain lock into the other lock half.

5. The chain lock of claim 1, wherein the locking pin is part of an end surface of the one coupling section and sized to extend with its free end to the rear surface of the other lock half so as to form part of the rear surface of the other lock halt.

6. The chain lock of claim 1, wherein the rear section of each of the two lock halves has a center support, with the center support of the rear section of one lock half interlocking with the center support of the rear section of the other lock half.

7. The chain lock of claim 6, wherein one of the center supports has a groove in the longitudinal direction of the chain lock, and the other one of the center supports has a tongue that fits into the groove, with the groove and the tongue being traversed by at least one cross bore for receiving the locking pin.

8. A chain lock for steel chains, comprising:
a first lock half having a first longitudinal rear section, each end of the first longitudinal rear section terminating in respective first coupling sections, one of the first coupling sections having a first locking pin which is positioned transversely to the first longitudinal rear section, and the other of the first coupling sections having a first fork leg projecting longitudinally from the first longitudinal rear section;
a first pocket bordered by the first locking pin;
a second lock half having a second longitudinal rear section, each end of the second longitudinal rear section terminating in respective second coupling sections, one of the second coupling sections having a second locking pin which is positioned transversely to the second longitudinal rear section, and the other of the second coupling sections having a second fork leg projecting longitudinally from the second longitudinal rear section; and
a second pocket bordered by the second locking pin,
wherein each of the first and second pockets has substantially linear outer flanks that enclose an angle in a range from 120° to 150°;
wherein the first leg fork is structured to engage the substantially linear outer flanks of the second pocket; and
wherein the second leg fork is structured to engage the substantially outer flanks of the first pocket.

\* \* \* \* \*